United States Patent
Hong et al.

(10) Patent No.: US 11,214,310 B2
(45) Date of Patent: Jan. 4, 2022

(54) VEHICLE BODY ON WHICH A HIGH VOLTAGE BATTERY IS MOUNTED

(71) Applicants: Hyundai Motor Company, Seoul (KR); Kia Motors Corporation, Seoul (KR)

(72) Inventors: Deok Hwa Hong, Suwon-si (KR); Hee Seouk Chung, Hwaseong-si (KR); Byeong Cheon Lee, Seoul (KR); Hyun Sik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 71 days.

(21) Appl. No.: 16/870,015

(22) Filed: May 8, 2020

(65) Prior Publication Data
US 2021/0171102 A1 Jun. 10, 2021

(30) Foreign Application Priority Data
Dec. 4, 2019 (KR) .......................... 10-2019-0159493

(51) Int. Cl.
| | | |
|---|---|---|
| B62D 25/20 | (2006.01) | |
| B62D 21/03 | (2006.01) | |
| B62D 25/02 | (2006.01) | |
| B60K 1/04  | (2019.01) | |
| B62D 25/04 | (2006.01) | |
| B62D 21/15 | (2006.01) | |

(52) U.S. Cl.
CPC .............. *B62D 21/03* (2013.01); *B60K 1/04* (2013.01); *B62D 25/025* (2013.01); *B62D 25/04* (2013.01); *B62D 25/2036* (2013.01); *B60K 2001/0405* (2013.01); *B62D 21/15* (2013.01)

(58) Field of Classification Search
CPC .. B62D 21/03; B62D 25/025; B62D 25/2036; B62D 25/04; B62D 21/15; B62D 25/2018; B62D 25/082; B60K 1/04; B60K 2001/0405; B60K 2001/0438
USPC .......................................................... 296/204
See application file for complete search history.

(56) References Cited

U.S. PATENT DOCUMENTS

| | | | | |
|---|---|---|---|---|
| 9,272,637 B2 * | 3/2016 | Han | .................. | B62D 25/2036 |
| 9,493,188 B2 * | 11/2016 | Atsumi | .................. | B62D 25/20 |
| 10,507,869 B2 * | 12/2019 | Inoue | .................... | B62D 43/10 |

(Continued)

FOREIGN PATENT DOCUMENTS

JP 2017193289 A 10/2017

*Primary Examiner* — Pinel E Romain
(74) *Attorney, Agent, or Firm* — Slater Matsil, LLP (57) ABSTRACT

A vehicle body on which a high voltage battery is mounted is provided. The vehicle body includes a vehicle body floor on which a battery is placed stably, side sills disposed on both lateral sides of the vehicle body floor, respectively, to extend in forward and backward directions, a plurality of coupling members, wherein front portions of the coupling members are combined with respective front side members, rear portions of the coupling members are combined with the side sills, respectively, and each coupling member connects, in an extension line, between the respective front side member and the respective side sill in the forward and backward directions, and a cross member that extends across the vehicle body floor and couples the coupling members, wherein each end of the cross member is combined with the respective side sill.

20 Claims, 8 Drawing Sheets

(56) References Cited

U.S. PATENT DOCUMENTS

| | | | |
|---|---|---|---|
| 10,549,787 B2* | 2/2020 | Kita | B62D 25/2045 |
| 10,780,776 B2* | 9/2020 | Banno | B60K 1/04 |
| 10,967,722 B2* | 4/2021 | Tanaka | B60K 1/04 |
| 10,967,908 B2* | 4/2021 | Tsuyuzaki | B60R 16/04 |
| 2017/0305251 A1 | 10/2017 | Hara et al. | |
| 2020/0307695 A1* | 10/2020 | Tanaka | B62D 25/088 |
| 2020/0385059 A1* | 12/2020 | Kubota | B62D 21/152 |
| 2021/0086837 A1* | 3/2021 | Sato | B62D 25/16 |

* cited by examiner

VEHICLE BODY ON WHICH A HIGH VOLTAGE BATTERY IS MOUNTED

CROSS-REFERENCE TO RELATED APPLICATIONS

This application claims priority to Korean Patent Application No. 10-2019-0159493, filed on Dec. 4, 2019, which application is hereby incorporated herein by reference.

TECHNICAL FIELD

The present invention relates to a vehicle body on which a high voltage battery is mounted.

BACKGROUND

In recent years, due to environmental problems and a high oil price, there has been a growing interest in environment-friendly vehicles, and thus various electric vehicles that travel using electric energy have been under development.

Electric vehicles under development include battery-powered electric vehicles, fuel cell electric vehicles that use a fuel cell as a motor, hybrid electric vehicles that use a motor and an engine, and so on.

Particularly, an electric vehicle is equipped with a battery module for storing electric energy, and the battery module is obtained by accommodating a plurality of battery cell units within a battery housing. The battery cell unit in the battery module has to be prevented from being damaged from external impact.

On the other hand, only front side members that are configured to protect a high voltage battery mounted on a vehicle body floor when a head-on collision occurs have been present in the related art. However, a high voltage battery is difficult to protect only with the front side members when a vehicle undergoes the head-on collision. Vehicle body deformation and direct transfer of impact to the high voltage battery cause damage to the high voltage battery.

The foregoing is intended merely to aid in understanding the background of the present invention and therefore should not be interpreted to admit that the present invention falls within the purview of the related art that is already known to those skilled in the art.

SUMMARY

The present invention relates to a vehicle body on which a high voltage battery is mounted. Particular embodiments relate to a vehicle body on which a high voltage battery is mounted and which distributes impact when a vehicle undergoes a collision and thus prevents the high voltage battery from being damaged.

According to an embodiment of the present invention, there is provided a vehicle body on which a high voltage battery is mounted, the vehicle body including a vehicle body floor on which a battery is placed stably and on both lateral sides of which side sills are disposed, respectively, to extend in forward and backward directions, a plurality of coupling members, with front portions of which front side members are combined, respectively, rear portions of which are combined with the side sills, respectively, and each of which thus connects, in an extension line, between the front side member and the side sill in the forward and backward directions, and a cross member that extends across the vehicle body floor and thus couples the coupling members, each of which is combined with the side sill.

In the vehicle body, the side sill and the coupling member may be formed to extend in such a manner as to be spaced a distance apart in front of the battery, and the battery may thus be disposed inward from the side sill and the coupling member on the vehicle body floor.

In the vehicle body, the front portion of the coupling member may be positioned within the vehicle body floor and be combined with the front side member, a middle portion thereof may extend in a manner that is increasingly curved outward toward the backward direction, and thus the rear portion thereof may be combined with the side sill.

In the vehicle body, an upper-end panel and a lower-end panel may be formed on an external flank surface of the coupling member in such a manner as to be spaced a distance apart in upward and downward directions, and a plurality of reinforcement ribs may be formed in such a manner as to be connected to each other between the upper-end panel and the lower-end panel.

In the vehicle body, a reinforcement panel that is combined through the upper-end panel, the lower-end panel, and the reinforcement ribs in such a manner that the coupling member has a closed cross-section may be provided on the external flank surface of the coupling member.

In the vehicle body, downward-sloped surfaces may be formed, from the top downward, on both end portions, respectively, of the cross member, sloped surfaces that have the same plane as the downward-sloped surfaces of the cross member may be formed on the coupling members, respectively, and thus the cross member and the coupling members may be combined with each other by bringing the downward-sloped surfaces and the sloped surfaces into contact with each other.

In the vehicle body, a reinforcement panel of which a front-end portion extends toward the front side member and of which a rear-end portion extends toward the side sill may be combined with the external flank surface of the coupling member.

In the vehicle body, a forming portion that is recessed inward may be formed in an external flank surface of the reinforcement panel in a manner that extends in the forward and backward directions.

In the vehicle body, the front-end portion of the reinforcement panel may be brought into contact with the front side member, and the rear-end portion thereof may be brought into contact with the side sill.

In the vehicle body, the front-end portion of the reinforcement panel may be combined with the front side member, and the rear-end portion thereof may be combined with the side sill.

In the vehicle body, a pillar frame may be combined with an upper surface of the side sill, and the reinforcement panel may be formed in such a manner that the rear-end portion thereof, along with the side sill, is brought into contact with the pillar.

In a vehicle body on which a high voltage battery having a structure as described above is mounted, a front side member and a side sill of the vehicle body are combined with each other with a coupling member in between, thereby forming a load path. Furthermore, with a reinforcement panel that is combined with the coupling member, strength is secured and, additionally, the load path up to neighboring components is formed, thereby improving the strength for providing resistance to a vehicle collision.

DETAILED DESCRIPTION OF ILLUSTRATIVE EMBODIMENTS

A vehicle body according to a preferable embodiment of the present invention will be described below with reference to the accompanying drawings.

Figure 1:
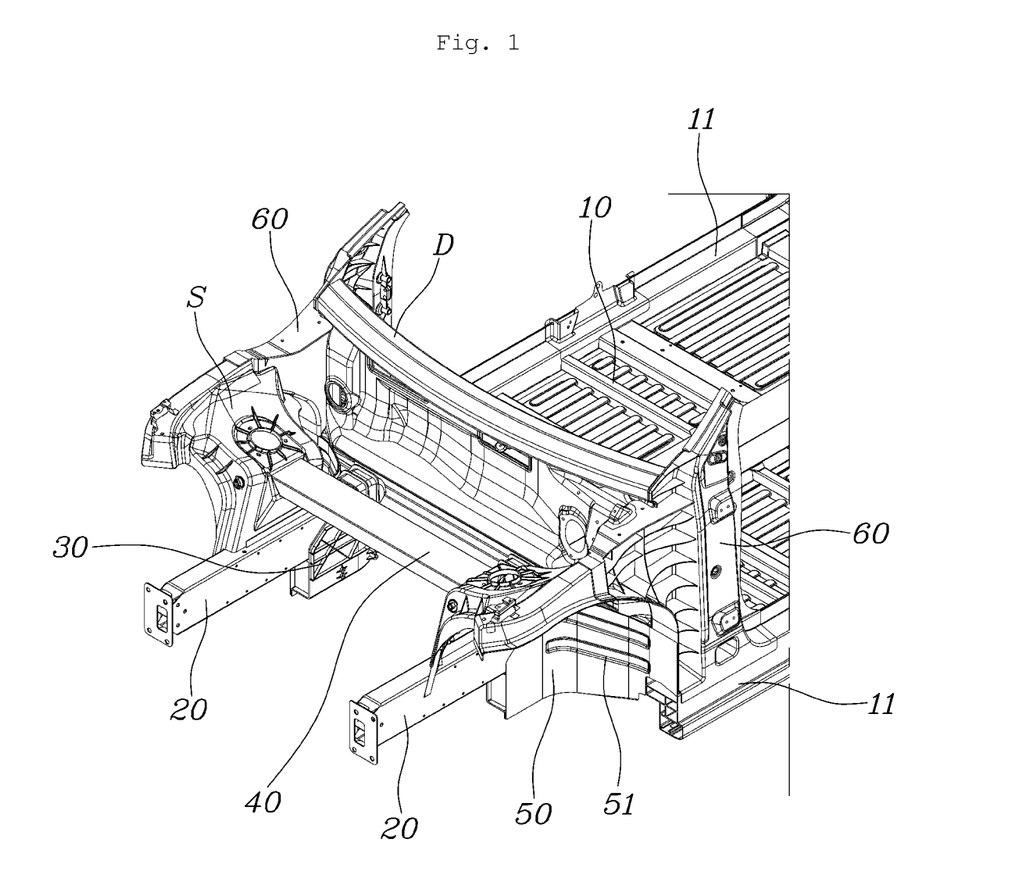
FIG. 1 is a diagram illustrating a vehicle body on which a high voltage battery according to an embodiment of the present invention is mounted.

FIG. 1 is a diagram illustrating a vehicle body on which a high voltage battery according to an embodiment of the present invention is mounted. FIGS. 2 to 8 are diagrams for describing the vehicle body on which the high voltage battery that is illustrated in FIG. 1 is mounted.

Figure 2:
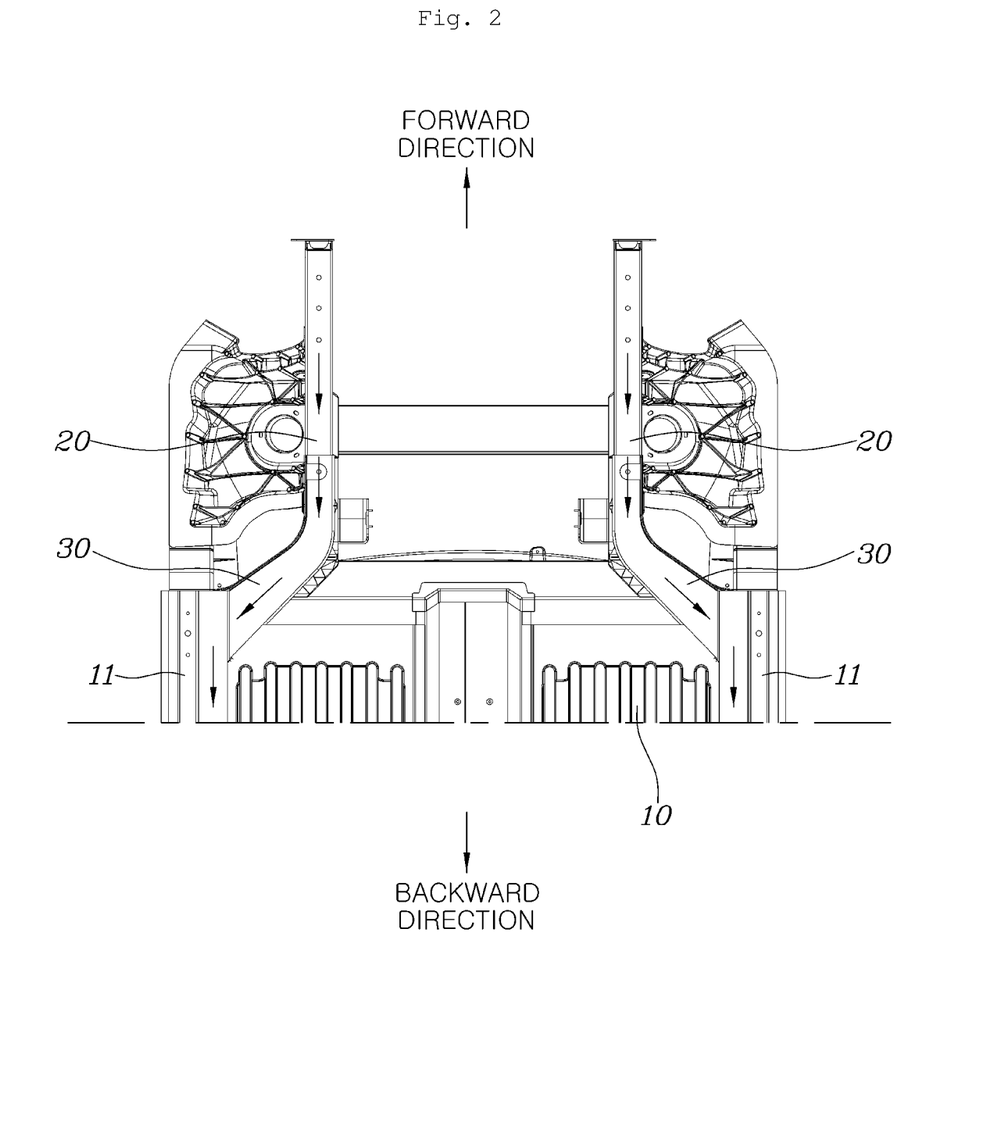
FIGS. 2 to 8 are diagrams for describing the vehicle body on which the high voltage battery that is illustrated in FIG. 1 is mounted.
Figure 3:
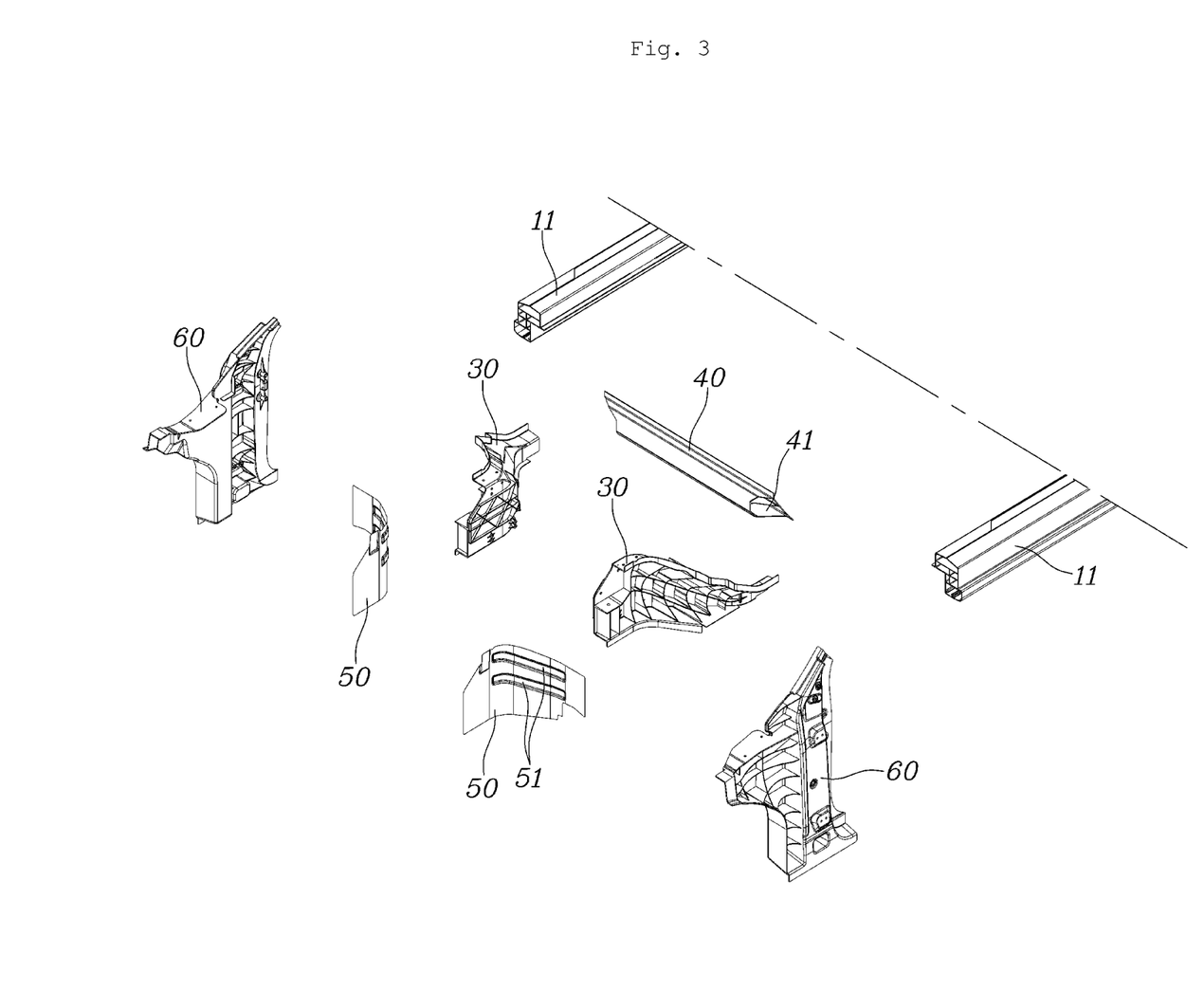

As illustrated in FIGS. 1 to 3, the vehicle body on which a high voltage battery is mounted includes a vehicle body floor 10 on which a battery is placed stably and on both lateral sides of which side sills 11 are disposed, respectively, to extend in forward and backward directions, a plurality of coupling members 30, with front portions of which front side members 20 are combined, respectively, rear portions of which are combined with the side sills 11, respectively, and each of which thus connects, in an extension line, between the front side member 20 and the side sill 11 in the forward and backward directions, and a cross member 40 that extends across the vehicle body floor 10 and thus couples the coupling members 30, each of which is combined with the side sill 11.

In this manner, the side sills 11 are provided on both sides, respectively, of the vehicle body floor 10, the coupling members 30 are combined with front portions, respectively, of the side sills 11, and the front side members 20 are coupled to the side sills 11 through the coupling members 30, respectively. A buffer portion may be provided on a front portion of the front side member 20 and a sub-frame S may be mounted on the buffer portion.

Particularly, the front side member 20 is combined with the front portion of the coupling member 30, and the side sill 11 is combined with the rear portion thereof. Thus, a load path from the front side member 20 through the coupling member 30 to the side sill 11, along which a load due to a head-on collision is distributed, is formed, thereby securing strength for providing resistance to the head-on collision.

In addition, the cross member 40 extends across the vehicle body floor 10 and is combined with each coupling member 30. Thus, the load due to the head-on collision is distributed to the coupling members 30 and the side sills 11 that are provided to both sides, respectively, of the vehicle body floor 10. That is, a force of the collision is distributed among the multiple coupling members 30 and the multiple side sills 11. This efficient load path secures strength of the vehicle body floor 10. In this case, a dash-panel D may be provided over the cross member 40, and the dash-panel D may be mounted on a pillar frame 60.

Downward-sloped surfaces 41 may be formed, from the top downward, on both end portions, respectively, of the cross member 40. Sloped surfaces that have the same plane as the downward-sloped surfaces 41 of the cross member 40 are formed on the coupling members 30, respectively. The cross member 40 and the coupling members 30 may be combined with each other by bringing the downward-sloped surfaces 41 and the sloped surfaces in contact with each other. In this manner, the combining of the cross member 40 and the coupling members 30 through their respective sloped surfaces secures a contact area, thereby securing excellent combining capability. The cross member 40 is coupled to both the coupling members 30 in front of the vehicle body floor 10, and the vehicle body floor 10 and the side sill 11 are coupled to each other. Thus, an efficient load path can be formed.

In this manner, according to an embodiment of the present invention, the front side member 20, the coupling member 30, and the side sill 11 are formed in an extension line in the forward and backward directions, and thus a flexible load path is formed in the forward and backward directions. The coupling members 30 that are disposed on both sides, respectively, of the vehicle body floor 10 are combined by the cross member 40 to each other. Thus, as illustrated in FIG. 2, a load due to a vehicle collision is smoothly distributed to the front side members 20, the coupling members 30, and the side sills 11, thereby increasing overall strength.

Accordingly, strength of the vehicle body can be secured, and the battery placed stably on the vehicle body floor 10 can be prevented from being damaged due to the head-on collision.

Figure 4:
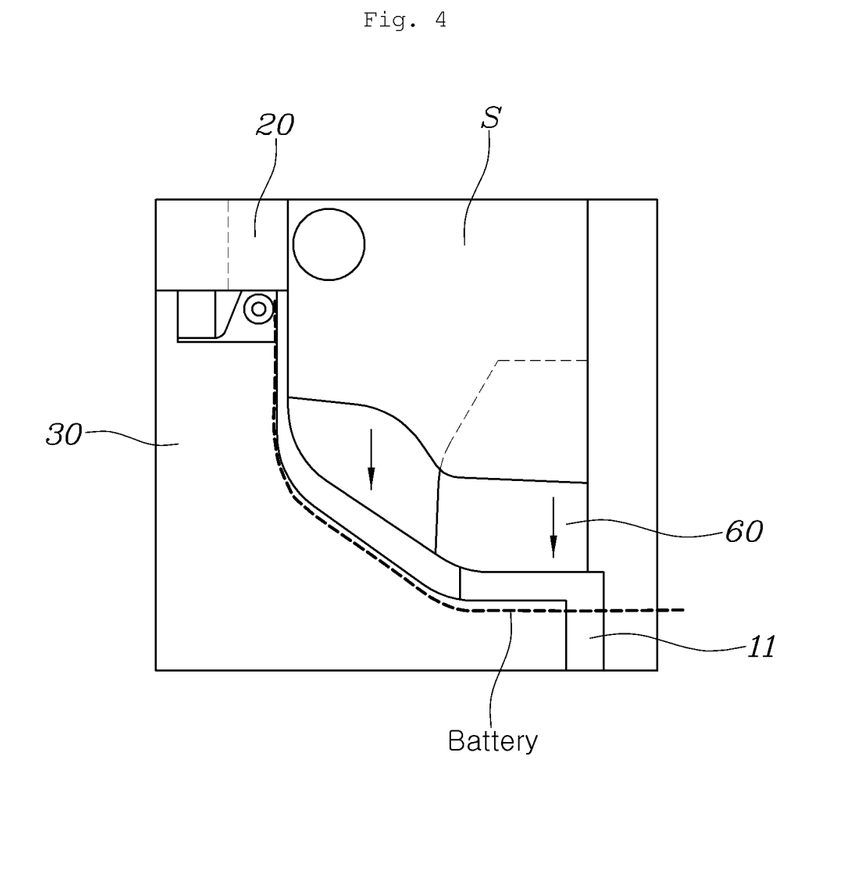

As illustrated in FIG. 4, according to an embodiment of the present invention, a detailed description is that the side sill 11 and the coupling member 30 may be formed to extend in a manner that is spaced a distance apart in front of the battery and that the battery may thus be disposed inward from the side sill 11 and the coupling member 30 on the vehicle body floor 10.

In this manner, the battery to be placed stably on the vehicle body floor 10 is disposed inward from, and is spaced a distance away from, the side sill 11 and the coupling member 30, thereby avoiding direct transfer of the load to the battery due to the head-on collision. That is, external forms of the side sill 11 and the coupling member 30 are disposed inward from, and are spaced a distance away from, the battery that is to be placed on the vehicle body floor 10. Thus, the load due to the vehicle collision is distributed to the side sills 11 and the coupling members 30, and, additionally, the direct transfer of the load to the battery due to the collision is avoided by the spacing, thereby preventing the battery from being damaged.

Figure 5:
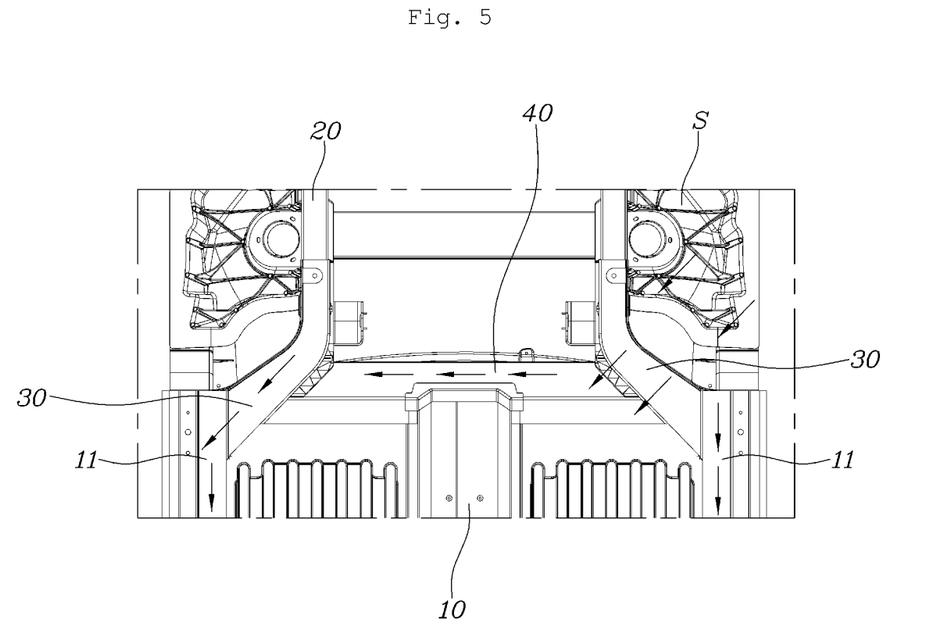

On the other hand, as illustrated in FIGS. 2 and 5, the front portion of the coupling member 30 may be positioned within the vehicle body floor 10 and be combined with the front side member 20, a middle portion thereof may extend in a manner that is increasingly curved outward toward the backward direction, and thus the rear portion thereof may be combined with the side sill 11.

In this manner, the extending of the coupling member 30 in an outward-curved manner can flexibly distribute the load occurring in the head-on collision to the front side members 20, the coupling members 30, and the side sills 11.

That is, the positioning of the front portion of each coupling member 30 within the vehicle body floor 10 makes it possible for the front side member 20 to be positioned within the vehicle body floor 10. Thus, a supporting force that is exerted against the head-on collision can be secured. The extending of the middle portion of the coupling member 30 in a manner that is increasingly curved outward toward the backward direction and the combining of the rear portion thereof with the side sill 11 distribute the load due to the head-on collision to the side sill 11. Thus, an efficient load path can be formed. In addition, although the head-on collision occurs in an inclination direction, the load path up to the cross member 40 as well as the side sill 11 coupled to the coupling member 30 is formed. Thus, with an efficient load path along which the load is distributed, the battery can be safely protected.

Figure 6:
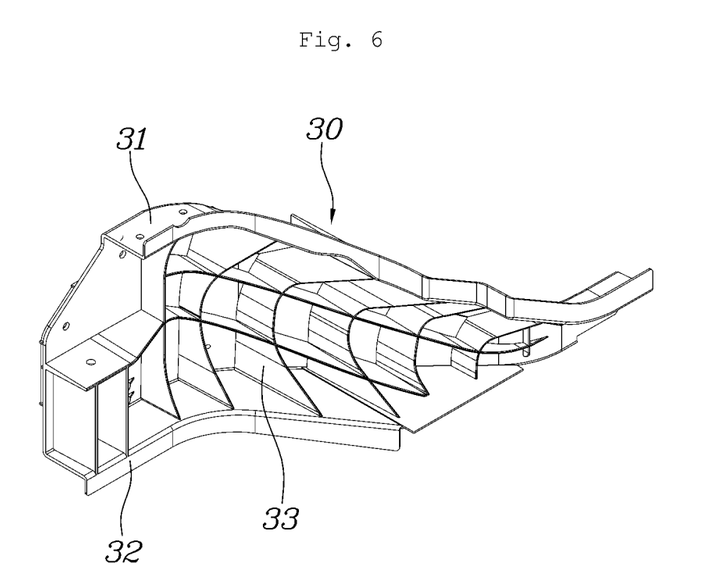

On the other hand, as illustrated in FIG. 6, an upper-end panel 31 and a lower-end panel 32 may be formed on an external flank surface of the coupling member 30 in such a manner as to be spaced a distance apart in upward and downward directions, and a plurality of reinforcement ribs 33 may be formed in such a manner as to be connected to each other between the upper-end panel 31 and the lower-end panel 32.

The front side member 20 and the side sill 11 are combined with the coupling member 30. Thus, the strength of the coupling member 30 has to be secured. Accordingly, the upper-end panel 31 and the lower-end panel 32 that are spaced a distance apart in the upward and downward directions are formed on the external flank surface of the coupling member 30, and the plurality of reinforcement ribs 33 are connected to each other between the upper-end panel 31 and the lower-end panel 32. Thus, overall strength of the coupling member 30 is improved. At this point, the plurality of reinforcement ribs 33 may be configured to include horizontal ribs that extend in the forward and backward directions along a line in which the horizontal portion of the coupling member 30 extends in the forward and backward directions, and vertical ribs that intersect the horizontal ribs in the upward and downward directions.

Along with this, a reinforcement panel 50 that is combined through the upper-end panel 31, the lower-end panel 32, and the reinforcement ribs 33 in such a manner that the coupling member 30 has a closed cross-section may be provided on the external flank surface of the coupling member 30. The reinforcement panel 50 is covered in such a manner as to cover the external flank surface of the coupling member 30 and is combined with the upper-end panel 31, the lower-end panel 32, and the reinforcement ribs 33, and thus secures the overall strength along with the coupling member 30. Furthermore, the reinforcement panel 50 is formed in such a manner as to be brought into contact with the front side member 20 and the side sill 11 in a state of being combined with the coupling member 30, and thus the load path from the front side member 20 to the side sill 11, including the coupling member 30, can be formed.

Figure 7:
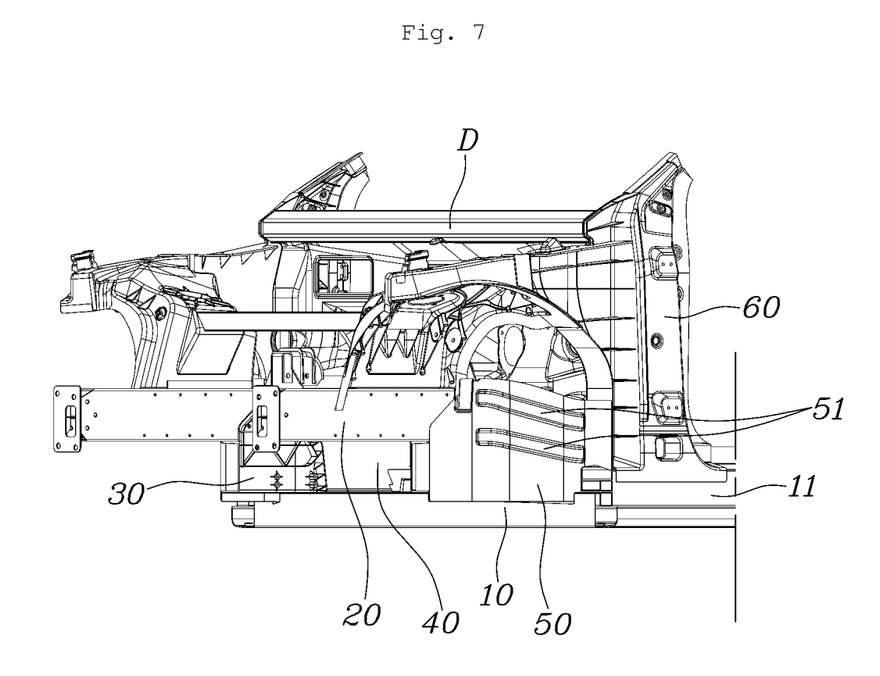
Figure 8:
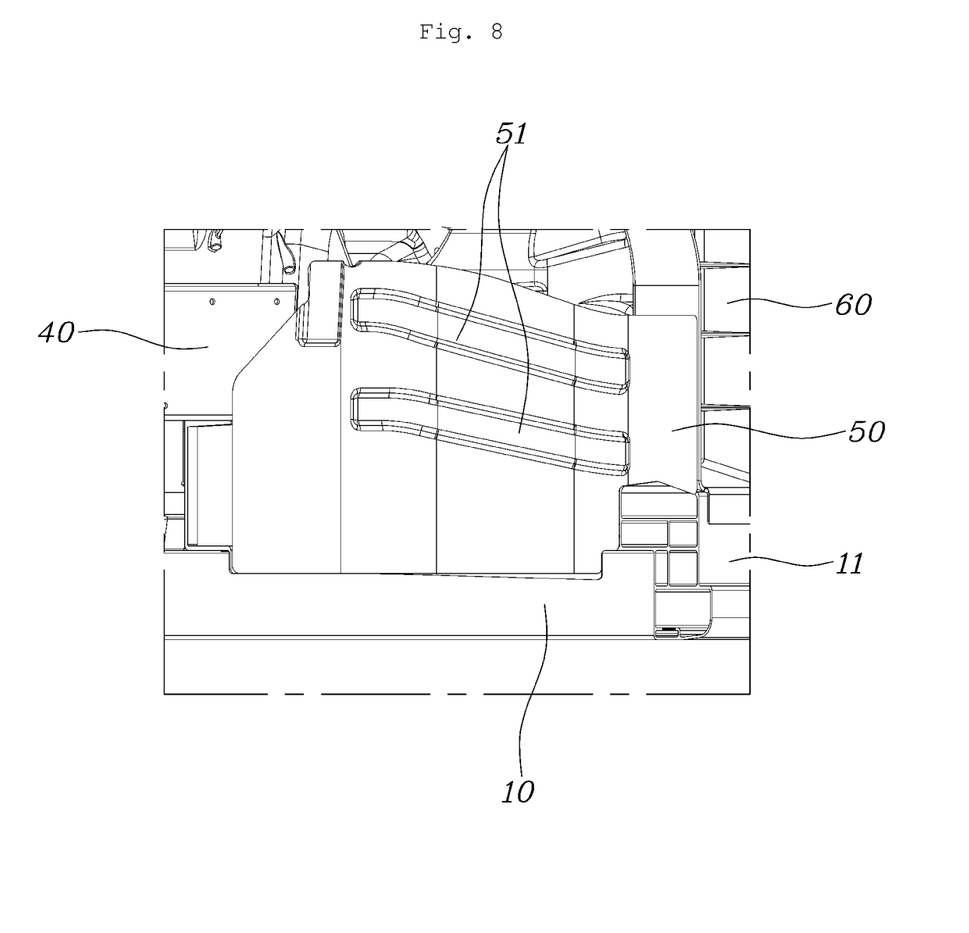

On the other hand, as illustrated in FIGS. 7 and 8, the reinforcement panel 50 of which a front-end portion extends toward the front side member 20 and of which a rear-end portion extends toward the side sill 11 may be combined with the external flank surface of the coupling member 30. In this manner, the front-end portion and the rear-end portion of the reinforcement panel 50 extend toward the front side member 20 and the side sill 11, respectively, and thus the reinforcement panel 50 is formed to cover the external flank surface of the coupling member 30 and is combined with the coupling member 30, thereby securing the overall strength of the coupling member 30.

A forming portion 51 that is recessed inward is formed in an external flank surface of the reinforcement panel 50 in a manner that extends in the forward and backward directions, thereby increasing the strength of the vehicle body. The forming portion 51 may be formed to extend in the forward and backward directions of the reinforcement panel 50. A plurality of forming portions 51 may be arranged in such a manner as to be spaced a distance apart from each other and may have a cross section with a fixed area.

In addition, the reinforcement panel 50 may be formed in such a manner that the front-end portion thereof is brought into contact with the front side member 20 and the rear-end portion thereof is brought into contact with the side sill 11. In this manner, the combining of the reinforcement panel 50 with the coupling member 30 can increase the strength of the coupling member 30. Additionally, the bringing of the front-end portion and rear-end portion of the reinforcement panel 50 into contact with the front side member 20 and the side sill 11, respectively, can form the load path from the front side member 20 to the side sill 11, including the coupling member 30. At this point, the front-end portion of the reinforcement panel 50 may be brought into contact with a flank surface of the front side member 20, and the rear-end portion thereof may be brought into contact with a front end of the side sill 11. The simple connection can reduce the number of combining processes.

On the other hand, the front-end portion of the reinforcement panel 50 may be combined with the front side member 20, and the rear-end portion thereof may be combined with the side sill 11. In this manner, in a state where the reinforcement panel 50 is combined with the coupling member 30, the front-end portion thereof is combined with the front side member 20 and the rear-end portion thereof is combined with the side sill 11, and thus the combining strength between the front side member 20 and the side sill 11 with the coupling member 30 in between can be secured and the load path from the front side member 20 to the side sill 11 can be formed including the coupling member 30.

On the other hand, the pillar frame 60 may be combined with an upper surface of the side sill 11. The pillar frame 60 is coupled to the vehicle body frame and may be an A pillar frame that is coupled to an A pillar. The dash-panel D may be mounted on the pillar frame 60.

On the other hand, the reinforcement panel 50 is formed in such a manner that the rear-end portion thereof, along with the side sill 11, is brought into contact with the pillar frame 60, and thus the load path up to the pillar frame 60 is formed. That is, the coupling member 30 is coupled to the front side member 20 and the side sill 11, and thus the load path is formed. The reinforcement panel 50 combined with the coupling member 30 is brought into contact with the pillar frame 60, and thus the load that is to be transferred through the front side member 20 is distributed to the pillar frame 60 along with the side sill 11. As a result, the overall strength can be secured. The reinforcement panel 50 is brought into contact with, or combined with, a front portion of the pillar frame 60, and the load that is to be transferred when the head-on collision occurs can also be distributed to the pillar frame 60.

In the vehicle body on which the high voltage battery that has the structure as described above is mounted, the front side member 20 and the side sill 11 of the vehicle body are combined with each other with the coupling member 30 in between, thereby forming the load path. With the reinforcement panel 50 that is combined with the coupling member 30, the strength is secured and, additionally, the load path up to the neighboring components is formed, thereby improving the strength for providing the resistance to the vehicle collision.

The specific embodiments of the present invention are illustrated and described, and it will be obvious to a person of ordinary skill in the art that various modifications and alterations are possibly made to the present invention without departing from the technical idea of the present invention that is claimed in the following claims.

What is claimed is:

1. A vehicle body comprising:
   a vehicle body floor that includes a battery location on which a battery is to be placed stably;
   side sills disposed on lateral sides of the vehicle body floor, respectively, to extend in forward and backward directions;

a plurality of coupling members, wherein front portions of the coupling members are combined with respective front side members, rear portions of the coupling members are combined with the side sills, respectively, and each coupling member connects, in an extension line, between the respective front side member and the respective side sill in the forward and backward directions; and a cross member that extends across the vehicle body floor and couples the coupling members, wherein each end of the cross member is combined with the respective side sill.

2. The vehicle body according to claim 1, wherein:
the side sills and the coupling members are spaced a distance apart in front of the battery location; and
the battery location is disposed inward from the side sills and the coupling members on the vehicle body floor.

3. The vehicle body according to claim 1, wherein the front portion of each coupling member is positioned within the vehicle body floor and is combined with the respective front side member, a middle portion of each coupling member extends in a manner that is increasingly curved outward toward the backward direction, and the rear portion of each coupling member is combined with the respective side sill.

4. The vehicle body according to claim 1, further comprising:
an upper-end panel and a lower-end panel formed on an external flank surface of one of the coupling members and spaced a distance apart in upward and downward directions; and
a plurality of reinforcement ribs connected to each other between the upper-end panel and the lower-end panel.

5. The vehicle body according to claim 4, further comprising a reinforcement panel combined through the upper-end panel, the lower-end panel, and the reinforcement ribs, wherein the coupling member has a closed cross-section on the external flank surface of the coupling member.

6. The vehicle body according to claim 1, further comprising:
downward-sloped surfaces formed on both end portions of the cross member, wherein the downward-sloped surfaces are formed from a top surface downward; and
sloped surfaces having a same plane as the downward-sloped surfaces formed on the coupling members,
wherein the cross member and the coupling members are configured to be combined with each other by bringing the downward-sloped surfaces and the sloped surfaces into contact with each other.

7. The vehicle body according to claim 1, further comprising a reinforcement panel, wherein a front-end portion of the reinforcement panel extends toward one of the front side members and a rear-end portion of the reinforcement panel extends toward one of the side sills, and wherein the reinforcement panel is combined with an external flank surface of one of the coupling members.

8. The vehicle body according to claim 7, further comprising a forming portion that is recessed inward formed in an external flank surface of the reinforcement panel, wherein the forming portion extends in the forward and backward directions.

9. The vehicle body according to claim 7, wherein the front-end portion of the reinforcement panel contacts the respective front side member, and the rear-end portion of the reinforcement panel contacts the respective side sill.

10. The vehicle body according to claim 7, wherein the front-end portion of the reinforcement panel combines with the respective front side member, and the rear-end portion of the reinforcement panel combines with the respective side sill.

11. The vehicle body according to claim 7, further comprising a pillar frame combined with an upper surface of the respective side sill, wherein the rear-end portion of the reinforcement panel and the respective side sill contact the pillar frame.

12. A vehicle body comprising:
a vehicle body floor;
a battery disposed on the vehicle body floor;
a first side sill disposed on a first lateral side of the vehicle body floor and a second side sill disposed on a second lateral side of the vehicle body floor;
a first front side member disposed towards the first lateral side of the vehicle body and a second front side member disposed towards the second lateral side of the vehicle body;
a first coupling member, wherein a front portion of the first coupling member is coupled with the first front side member, and wherein a rear portion of the first coupling member is coupled to the first side sill;
a second coupling member, wherein a front portion of the second coupling member is coupled with the second front side member, and wherein a rear portion of the second coupling member is coupled to the second side sill; and
a cross member extending across the vehicle body floor, wherein a first end of the cross member is coupled to the first side sill and a second end of the cross member is coupled to the second side sill.

13. The vehicle body according to claim 12, wherein a middle portion of the first coupling member curves outward toward the first lateral side of the vehicle body, and wherein a middle portion of the second coupling member curves outward toward the second lateral side of the vehicle body.

14. The vehicle body according to claim 12, further comprising:
an upper-end panel and a lower-end panel formed on an external flank surface of the first coupling member, wherein the upper-end panel and the lower-end panel are spaced a distance apart in upward and downward directions; and
a plurality of reinforcement ribs connected to each other between the upper-end panel and the lower-end panel.

15. The vehicle body according to claim 14, further comprising a reinforcement panel combined through the upper-end panel, the lower-end panel, and the reinforcement ribs, wherein the first coupling member has a closed cross-section on the external flank surface of the first coupling member.

16. The vehicle body according to claim 12, further comprising:
downward-sloped surfaces on both end portions of the cross member, wherein the downward-sloped surfaces are formed from a top surface downward; and
sloped surfaces having a same plane as the downward-sloped surfaces formed on the first coupling member and the second coupling member,
wherein the cross member is configured to be combined with the first coupling member and the second coupling member by bringing the downward-sloped surfaces and the sloped surfaces into contact with each other.

17. The vehicle body according to claim 12, further comprising a reinforcement panel, wherein a front-end portion of the reinforcement panel extends toward the first front side member and a rear-end portion of the reinforcement panel extends toward the first side sill, and wherein the reinforcement panel is combined with an external flank surface of the first coupling member.

18. The vehicle body according to claim 17, wherein the front-end portion of the reinforcement panel contacts the first front side member, and the rear-end portion of the reinforcement panel contacts the first side sill.

19. The vehicle body according to claim 17, further comprising a second reinforcement panel, wherein a front-end portion of the second reinforcement panel extends toward the second front side member and a rear-end portion of the second reinforcement panel extends toward the second side sill, and wherein the second reinforcement panel is combined with an external flank surface of the second coupling member.

20. The vehicle body according to claim 17, further comprising a pillar frame combined with an upper surface of the first side sill, wherein the rear-end portion of the reinforcement panel and the first side sill contact the pillar frame.

* * * * *